United States Patent
Bowers

(10) Patent No.: US 9,914,340 B1
(45) Date of Patent: Mar. 13, 2018

(54) VEHICLE COWL ATTACHMENT

(71) Applicant: Nissan North America, Inc., Franklin, TN (US)

(72) Inventor: Kenneth Bowers, Romeo, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/371,517

(22) Filed: Dec. 7, 2016

(51) Int. Cl.
*B62D 25/08* (2006.01)
*B62D 25/10* (2006.01)
*B60H 1/28* (2006.01)
*B60H 1/00* (2006.01)

(52) U.S. Cl.
CPC ........... *B60H 1/28* (2013.01); *B60H 1/00564* (2013.01); *B62D 25/081* (2013.01); *B62D 25/10* (2013.01)

(58) Field of Classification Search
CPC .. B62D 25/081; B62D 25/10; B60H 1/00564; B60H 1/28
USPC .......................................................... 296/192
See application file for complete search history.

(56) References Cited

U.S. PATENT DOCUMENTS

| | | | | | |
|---|---|---|---|---|---|
| 4,332,187 | A | * | 6/1982 | Imai | B60H 1/28 296/192 |
| 4,699,419 | A | * | 10/1987 | Kawase | B62D 25/04 296/192 |
| 4,721,032 | A | | 1/1988 | Sakamoto | |
| 4,819,550 | A | * | 4/1989 | Ioka | B60H 1/28 454/147 |
| 4,883,309 | A | * | 11/1989 | Miyazaki | B62D 25/081 296/192 |
| 4,950,024 | A | * | 8/1990 | Watari | B60K 37/00 296/192 |
| 5,052,742 | A | * | 10/1991 | Akoshima | B62D 25/081 296/192 |
| 5,692,953 | A | | 12/1997 | Bell et al. | |
| 9,731,774 | B2 | * | 8/2017 | Teramoto | B62D 27/023 |
| 2010/0051712 | A1 | | 3/2010 | Lebeck | |
| 2011/0076435 | A1 | * | 3/2011 | Tachibana | B62D 25/081 428/43 |
| 2012/0091756 | A1 | * | 4/2012 | Suzuki | B62D 25/081 296/192 |
| 2013/0076071 | A1 | * | 3/2013 | Morden | B62D 25/081 296/192 |
| 2014/0017987 | A1 | | 1/2014 | Andersson | |
| 2017/0057463 | A1 | * | 3/2017 | Yamamoto | B60S 1/0402 |
| 2017/0203793 | A1 | * | 7/2017 | Nakamura | B62D 21/152 |
| 2017/0232820 | A1 | * | 8/2017 | Mitch | B60H 1/28 454/147 |

* cited by examiner

*Primary Examiner* — Gregory A Blankenship
(74) *Attorney, Agent, or Firm* — Global IP Counselors, LLP

(57) ABSTRACT

A vehicle includes a vehicle body, a cowl and a first cowl attachment. The vehicle body defines an engine compartment and a passenger compartment that is located rearward of the engine compartment. The cowl includes a top wall extending in a vehicle lateral direction between the engine and passenger compartments. The top wall has a first end wall at a first end and a second end wall at a second end. The first end wall has a plurality of first air receiving apertures. The first cowl attachment has a baffle wall part and a cowl extension part. The first cowl attachment is fixedly attached to the first end wall such that the baffle wall part is adjacent to the air receiving apertures. The cowl extension part extends in a vehicle lateral direction from the baffle wall part.

13 Claims, 8 Drawing Sheets

VEHICLE COWL ATTACHMENT

BACKGROUND

Field of the Invention

The present invention generally relates to a vehicle cowl having at least one cowl attachment part.

Background Information

Typically, vehicles include a cowl provided at the base of a windshield of the vehicle. The cowl includes a plurality of air receiving apertures which draw in fresh air from the vehicle exterior into a cowl box. The cowl then provides fresh air into the passenger compartment of the vehicle via ducts that connect the cowl and the passenger compartment.

SUMMARY

It has been discovered that due to the location of the cowl, fuel fumes emitted in the engine compartment can travel into the air receiving apertures of the cowl and enter the passenger compartment.

In a vehicle having a diesel engine a diesel particulate filter (DPF) is commonly included in the exhaust gas system. The diesel particulate filter removes diesel particulate matter or soot from the diesel engine exhaust gas flow. Over time diesel particulate matter or soot from the exhaust gas flow may accumulate on the DPF diminishing DPF performance. Vehicles commonly utilize a regeneration process to remove accumulated soot or particulate from the DPF. DPF regeneration processes may be achieved by passive or active means. Passive DPF regeneration may utilize heat from the engines exhaust, or by adding a catalyst to the filter. Active DPF regeneration may introduce high heat into the exhaust system using other means. DPF regeneration may include any other methods known in the art. Operating a vehicle in a DPF regeneration mode may result in increased exhaust gas flow and may further lead to exhaust gas being present in engine compartment.

In view of the state of the known technology, one aspect of the present disclosure is to provide a vehicle comprising a vehicle body, a cowl and a first cowl attachment. The vehicle body defines an engine compartment and a passenger compartment that is located rearward of the engine compartment. The cowl includes a top wall extending in a vehicle lateral direction between the engine and passenger compartments. The top wall has a first end wall at a first end and a second end wall at a second end. The first end wall has a plurality of first air receiving apertures. The first cowl attachment has a baffle wall part and a cowl extension part. The first cowl attachment is fixedly attached to the first end wall such that the baffle wall part is adjacent to the air receiving apertures. The cowl extension part extends in a vehicle lateral direction from the baffle wall part.

Also other objects, features, aspects and advantages of the disclosed vehicle cowl attachment will become apparent to those skilled in the art from the following detailed description, which, taken in conjunction with the annexed drawings, discloses one embodiment of the vehicle cowl attachment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
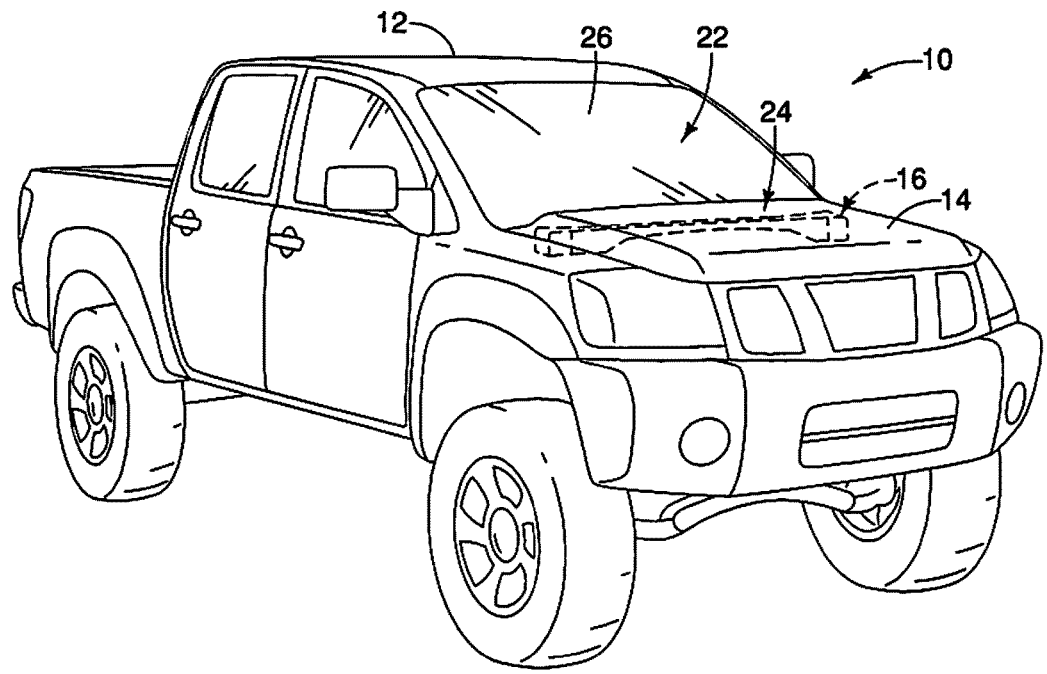
FIG. 1 is a front perspective view of a vehicle equipped with a cowl in accordance with an illustrated embodiment.
Figure 2:
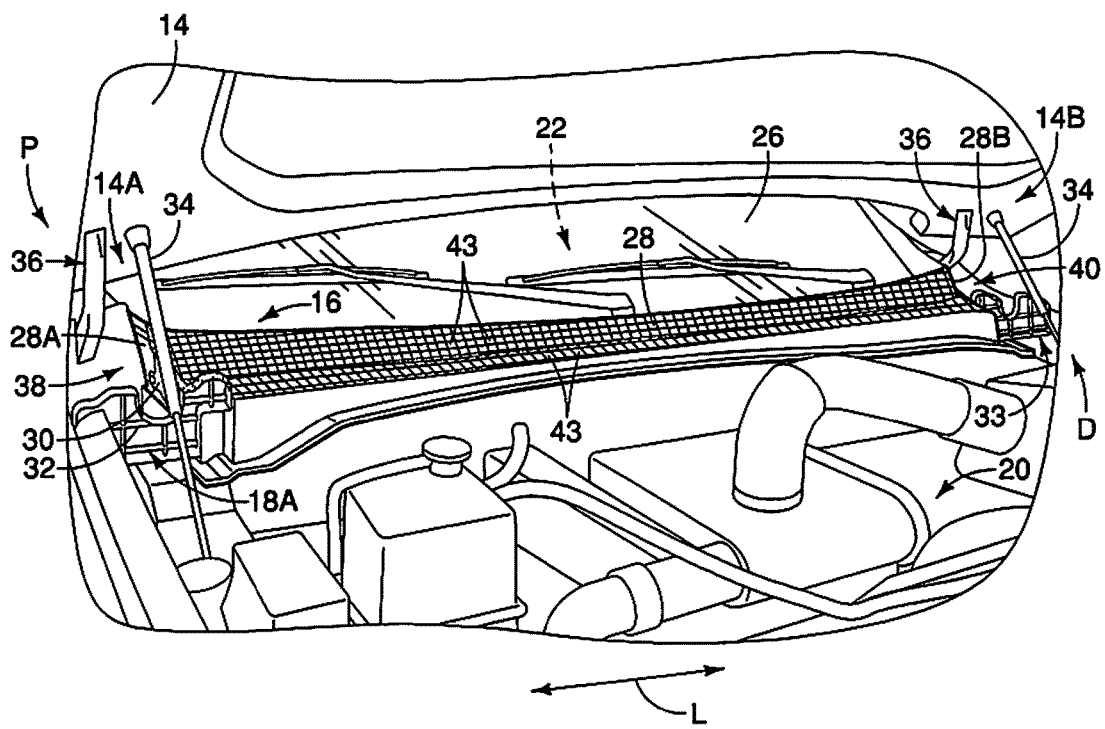
FIG. 2 is a partial front perspective view of the vehicle of FIG. 1 with the hood opened to show the cowl and a portion of an engine compartment.
Figure 3:
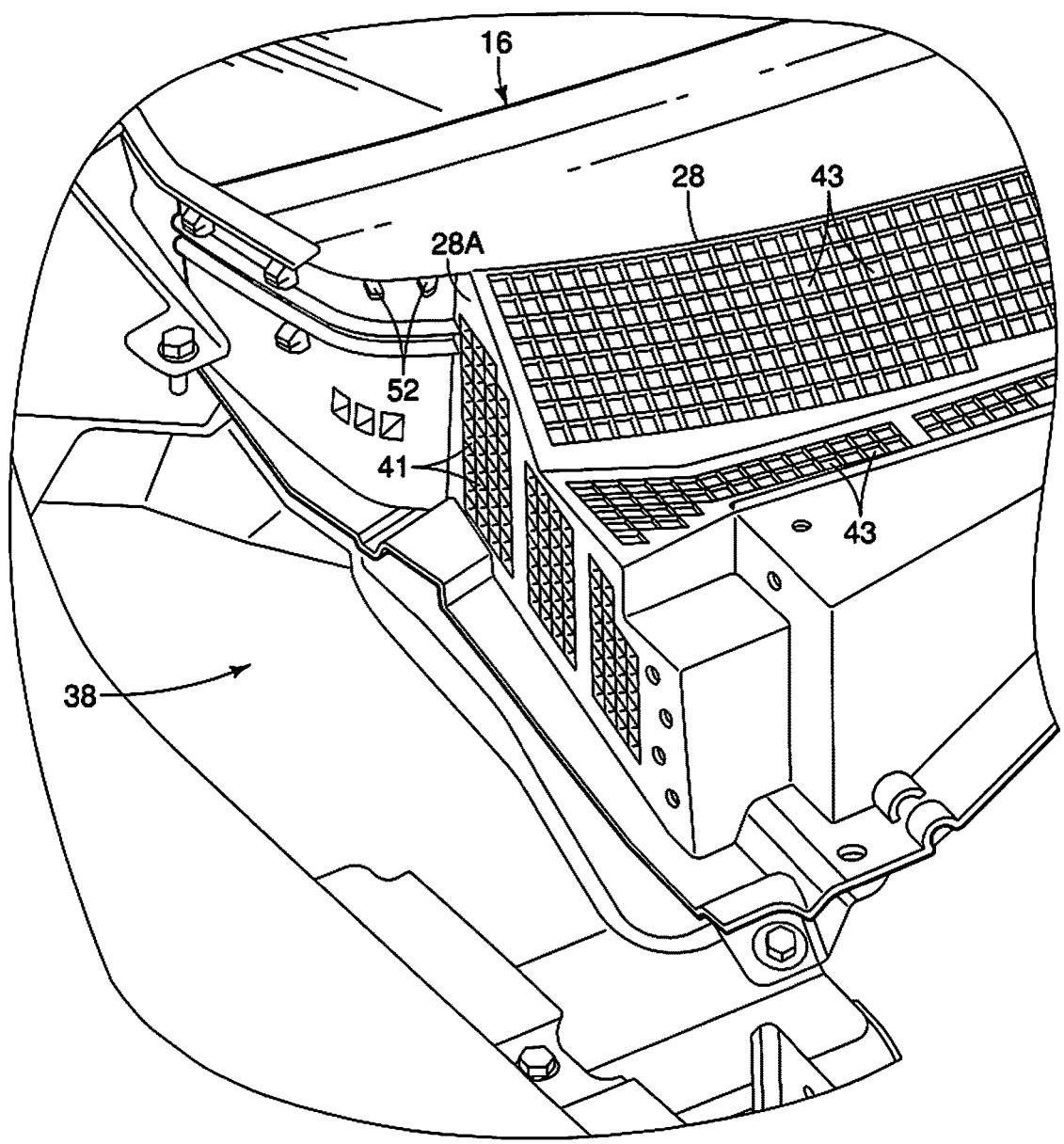
FIG. 3 is partial top perspective view of a first hinge support area of the vehicle of FIGS. 1 and 2 without a cowl attachment.
Figure 4:
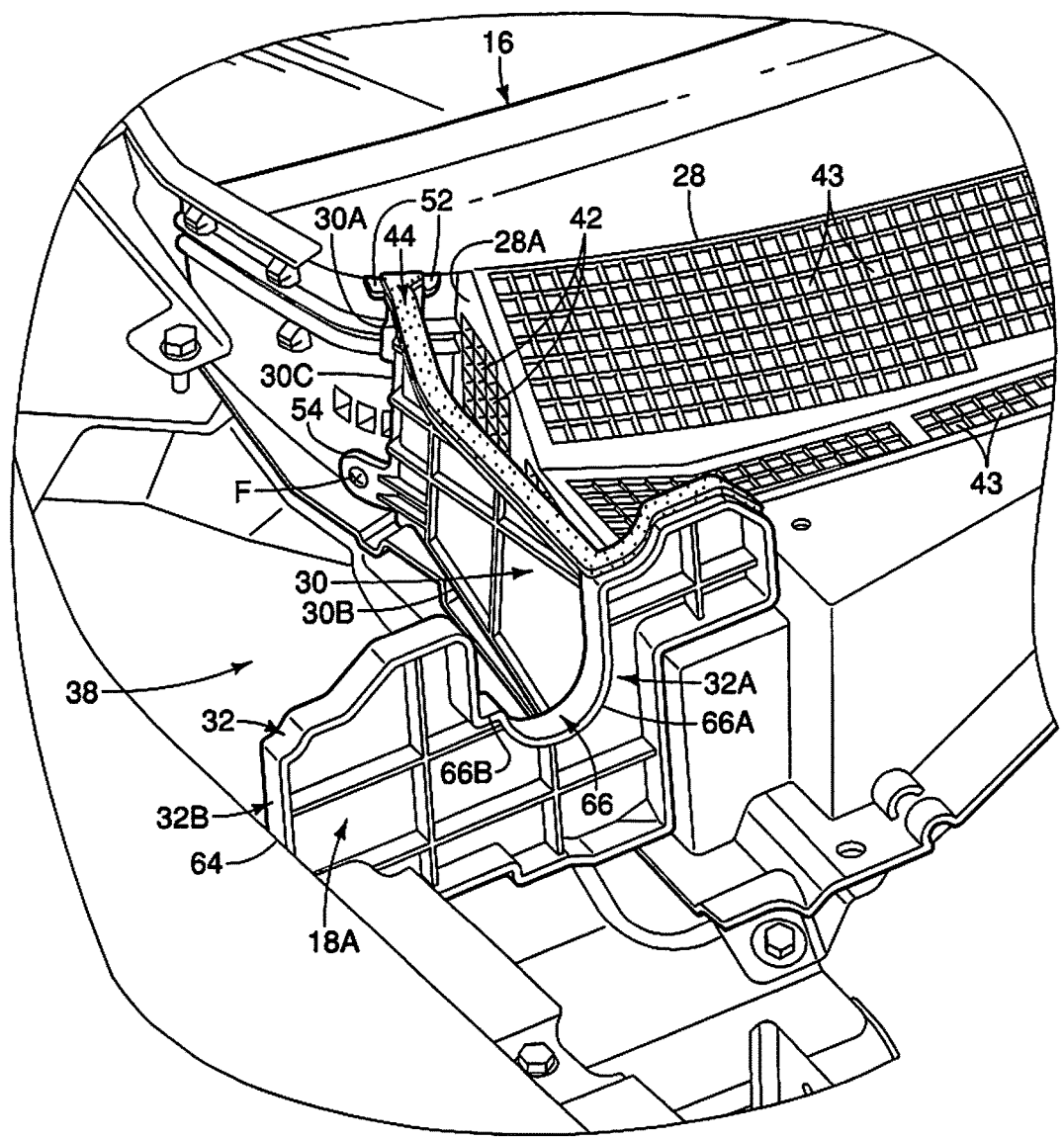
FIG. 4 is partial top perspective view of the first hinge support area of FIG. 3 with a first cowl attachment attached at a first end wall of the cowl.
Figure 6:
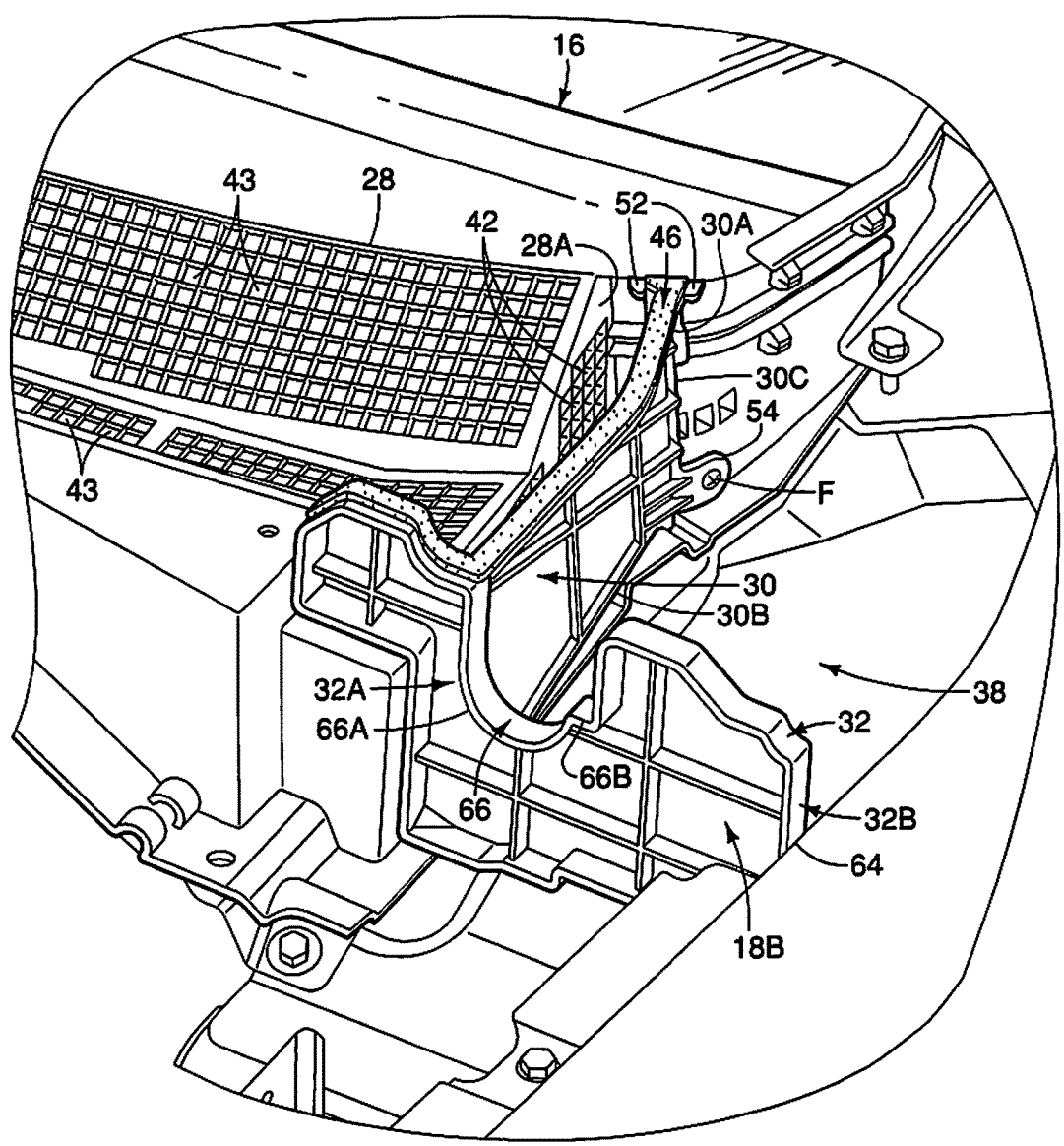
FIG. 6 is partial top perspective view of the second hinge support area of FIG. 5 with a second cowl attachment attached at a second end wall of the cowl.

Referring initially to FIG. 1, a vehicle 10 is illustrated in accordance with a first embodiment. The vehicle 10 comprises a vehicle body 12, a hood 14, a cowl 16 and a first cowl attachment 18A. In some instances, the vehicle 10 can further include a second cowl attachment 18B that is identical to the first cowl attachment 18A except for its location and it being a mirror image of the first cowl attachment 18A. In the illustrated embodiment, the vehicle 10 is illustrated in FIGS. 3 and 6 as being equipped with the first and second cowl attachments 18A and 18B. Of course, it will be apparent to those skilled in the art from this disclosure that the vehicle 10 can include the first cowl attachment 18A only (such as in FIG. 2) or both first and second cowl attachments 18A and 18B as needed. For the sake of brevity, only the first cowl attachment 18A will be discussed in detail herein. The vehicle body 12 defines an engine compartment 20 and a passenger compartment 22 that is located rearward of the engine compartment 20. As shown in FIG. 2, the vehicle body 12 includes a cowl area 24 located between the engine and passenger compartments 20 and 22. The cowl area 24 is adjacent to a windshield 26. The cowl 16 is disposed in the cowl area 24, and extends in a vehicle lateral direction L between the engine and passenger compartments 20 and 22. As shown, the cowl 16 extends laterally within the vehicle body 12, and is disposed rearwardly of the engine compartment 20 at a lower forward section of the windshield 26. Specifically, the cowl 16 includes a top wall 28 that extends in the vehicle lateral direction L between a passenger side P and a driver side D of the vehicle 10. The cowl 16 is disposed between the engine and passenger compartments 20 and 22. The top wall 28 has a first end wall 28A at a first end and a second end wall 28B at a second end. In the illustrated embodiment, the cowl 16 is provided with the first and second cowl attachments 18A and 18B that are fixedly attached at the first and second end walls 28A and 28B, respectively. The first cowl attachment 18A has a baffle wall part 30 and a cowl extension part 32. The second cowl attachment 18B may similarly have a baffle wall part 30 and a cowl extension part 32 as seen in FIG. 6. As previously stated, the vehicle 10 can include the first cowl attachment 18A only, which is illustrated as being disposed at the passenger side P of the vehicle 10. In this instance, the driver side P of the vehicle 10 can be configured to include just a cowl extension part 32 without the baffle wall part 30, as seen in FIG. 2.

In the illustrated embodiment, the first and second cowl attachments 18A and 18B are rigid members that are preferably made of molded plastic. The term "rigid" as used herein means reasonably inflexible and resistant to impact. In the illustrated embodiment, the first and second cowl attachments 18A and 18B are identical except for their location on the cowl 16 and being mirror images of each other. In the Figures, corresponding structures on the first and second cowl attachments 18A and 18B receive the same reference numerals for simplicity. Similarly, the first and second end walls 28A and 28B of the cowl 16 are identical except that they are located on opposite ends of the cowl 16. Thus, only the first cowl attachment 18A and the first end wall 28A will be discussed in this disclosure for brevity.

The hood 14 is movably attached to the vehicle body 12 by a first hood support structure 14A and a second hood support structure 14B. Typically, the first and second hood support structures 14A and 14B each include at least a hood strut 34 and a vehicle hood hinge 36 that hingedly support the vehicle hood 14 on the vehicle body 12. In the illustrated embodiment, the hood 14, the first end wall 28A and the cowl extension part 32 of the first cowl attachment 18A define a first hood hinge receiving space 38. The hood 14, the second end wall 28B and the cowl extension part 32 of the second cowl attachment 18B defines a second hood hinge receiving space 40. As shown in FIG. 2, the cowl 16 extends between the first and second hood hinge receiving spaces 38 and 40.

Typically, the cowl 16 is part of an air ventilation system. The cowl 16 is configured to draw fresh air from the vehicle exterior and directs the fresh air into the passenger compartment 22 of the vehicle 10 in a conventional manner. The cowl 16 has a plurality of air receiving apertures 41, 42 and 43. The air receiving apertures 41, 42 and 43 can have any shape and configuration required or desired to provide the necessary air flow to an HVAC unit (not shown). The air receiving apertures 41, 42 and 43 are provided so that outside air is drawn into the cowl 16 via the air receiving apertures 41, 42 and 43. The air drawn into the cowl 16 is then used for the HVAC unit and/or directly sent to the passenger compartment 22 through a duct coupling (not shown) the cowl 16 and the passenger compartment 22. Since the HVAC unit is a convention structure, further description is omitted for the sake of brevity.

Figure 5:
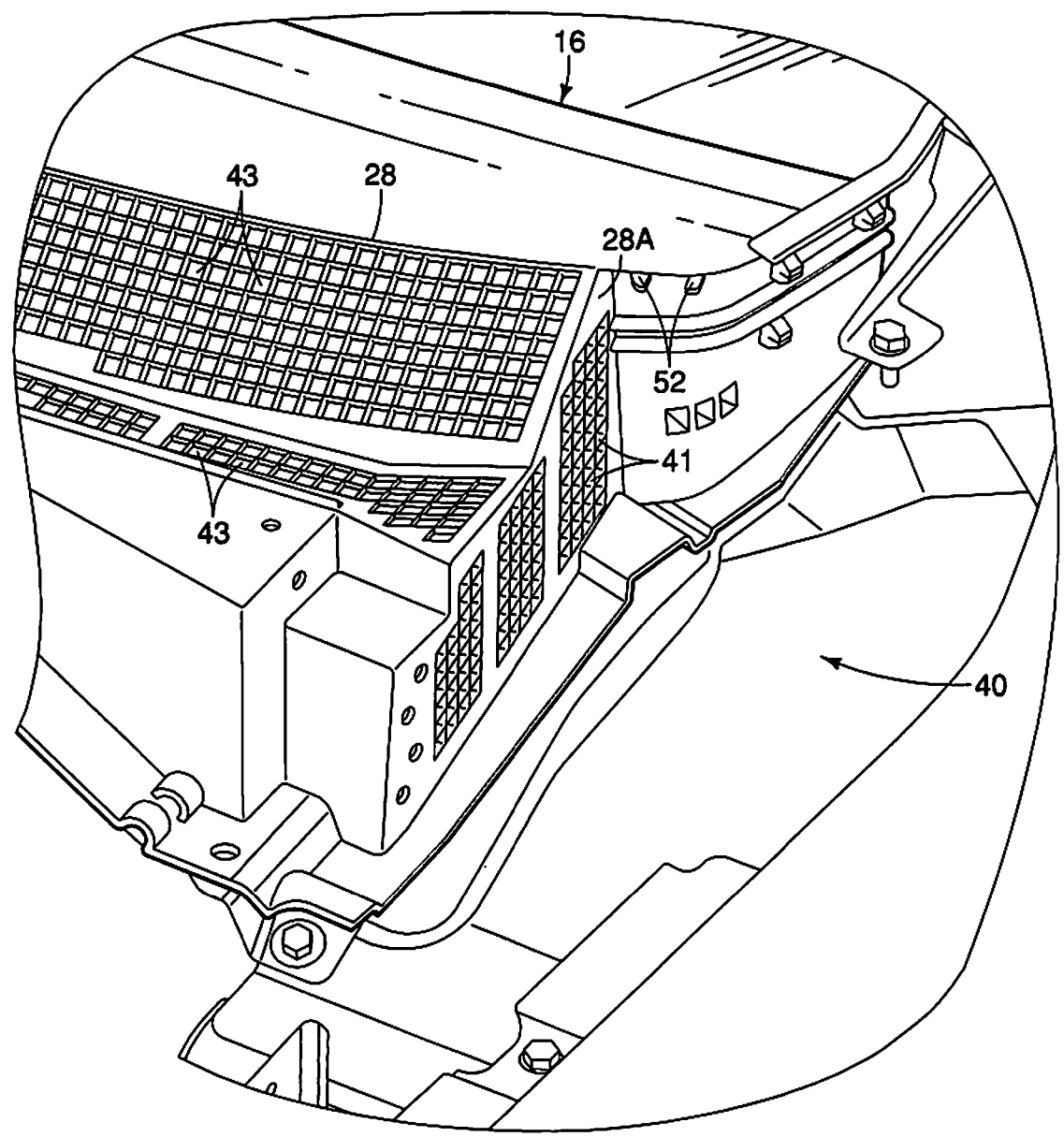
FIG. 5 is partial top perspective view of a second hinge support area of the vehicle of FIGS. 1 and 2 without a cowl attachment.

The first end wall 28A has the first air receiving apertures 41. In an exemplary embodiment, the second end wall 28B may have second air receiving apertures 42 that are identical to the first air receiving apertures 41 as shown in FIGS. 5 and 6. While both first and second end walls 28A and 28B are illustrated as having first and second air receiving apertures, it will be apparent to those skilled in the art from this disclosure that only the first end wall 28A includes air receiving apertures (i.e., the first air receiving apertures 41). The top wall 28 can also include third air receiving apertures 43. As stated, air drawn in through the first, second and third air receiving apertures 41, 42 and 43 can enter the passenger compartment 22. It has been discovered that in some instances, such as during regeneration mode in vehicles having diesel engines, exhaust or fuel fumes present in the engine compartment 20 can enter the passenger compartment 22 via the first, second and third air receiving apertures 41, 42 and 43. Thus, the cowl 16 of the illustrated embodiment is equipped with the first and second cowl attachments 18A and 18B.

As shown, the first cowl attachment 18A is fixedly attached to the first end wall 28A to block air flow from the engine compartment 20 from entering the first air receiving apertures 41. The second cowl attachment 18B is configured to be fixedly attached to the second end wall 28B to block air flow from the engine compartment 20 from entering the second air receiving apertures 42. Thus, fumes emitted in the engine compartment can travel past the first, second and third air receiving apertures 41, 42 and 43 to a space between the vehicle hood 14 and the engine compartment 20 that leads to the vehicle exterior.

The first cowl attachment 18A will now be further discussed. The baffle wall part 30 and the cowl extension part 32 are integrally formed as a one-piece structure. The cowl extension part 32 has a first end section 32A that is integral with the baffle wall part 30 and a second end section 32B that is cantilevered with respect to the baffle wall part 30. As shown, the baffle wall part 30 and the cowl extension part 32 extend angularly with respect to each other at approximately a ninety degree angle. It will be apparent to those skilled in the art from this disclosure that the baffle wall part 30 and the cowl extension part 32 can be separate components that are fixedly attached to each other. It will also be apparent to those skilled in the art that the baffle wall part 30 and the cowl extension part 32 can extend at various angles with respect to each other to fit into various types and shapes of vehicle spaces as needed and/or desired.

The baffle wall part 30 will now be discussed. The baffle wall part 30 includes an upper surface 30A, a bottom surface 30B and a side surface 30C. As stated, the first cowl attachment 18A is fixedly attached to the cowl 16 to prevent air in the engine compartment 20 from entering the first air receiving apertures 41. In the illustrated embodiment, the first cowl attachment 18A is fixedly attached to the first end wall 28A such that the baffle wall part 30 is adjacent to the first air receiving apertures 41. Similarly, in embodiments having second air receiving apertures 42 on the second end wall 28B, the second cowl attachment 18B may be attached to the second end wall 28B such that the baffle wall part 30 of the second cowl attachment 18B is adjacent to the second air receiving apertures 42 on the second end wall 28B. Here, the first and second cowl attachments 18A and 18B overlie the first and second air receiving apertures 41 and 42. In this disclosure, the term "adjacent" will be defined as "near or next to but not necessarily abutting." It will be apparent to those skilled in the art from this disclosure that a lateral gap G can form between the baffle wall part 30 and the first end wall 28A after attaching the first cowl attachment part 18A to the cowl 16, as best seen in FIG. 5. This allows for air flow from outside the vehicle 10 to pass into the first air receiving apertures 41 of the cowl 16. It will be also apparent to those skilled in the art that the baffle wall part 30 can be structured to directly contact the first end wall 28A. In the illustrated embodiment, the baffle wall part 30 is sized and dimensioned to substantially correspond to the size and shape of the first end wall 28A.

Figure 7:
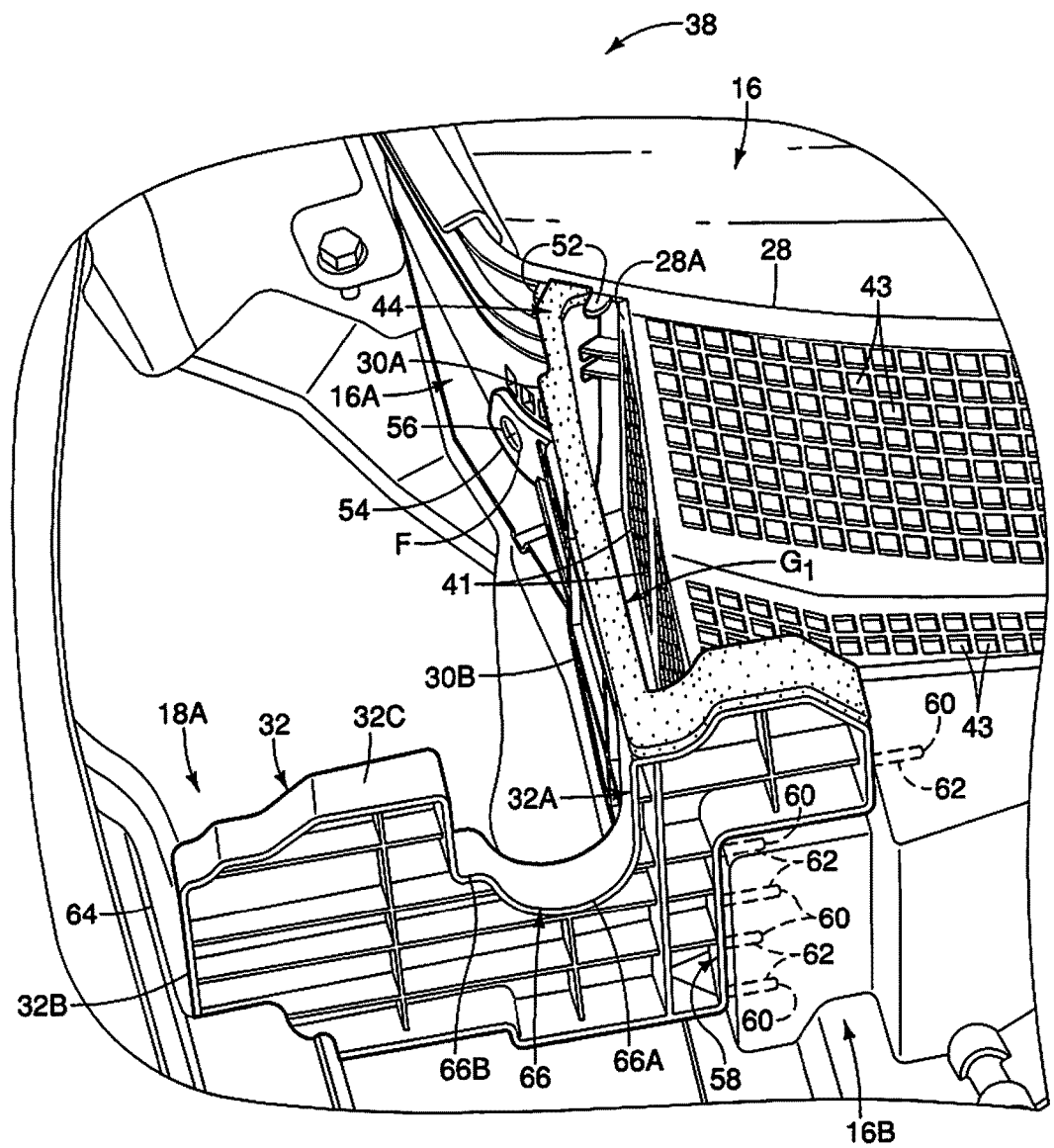
FIG. 7 is a top perspective view of the first hinge support area of FIGS. 3 and 4 with the first cowl attachment attached at the first end wall of the cowl.
Figure 8:
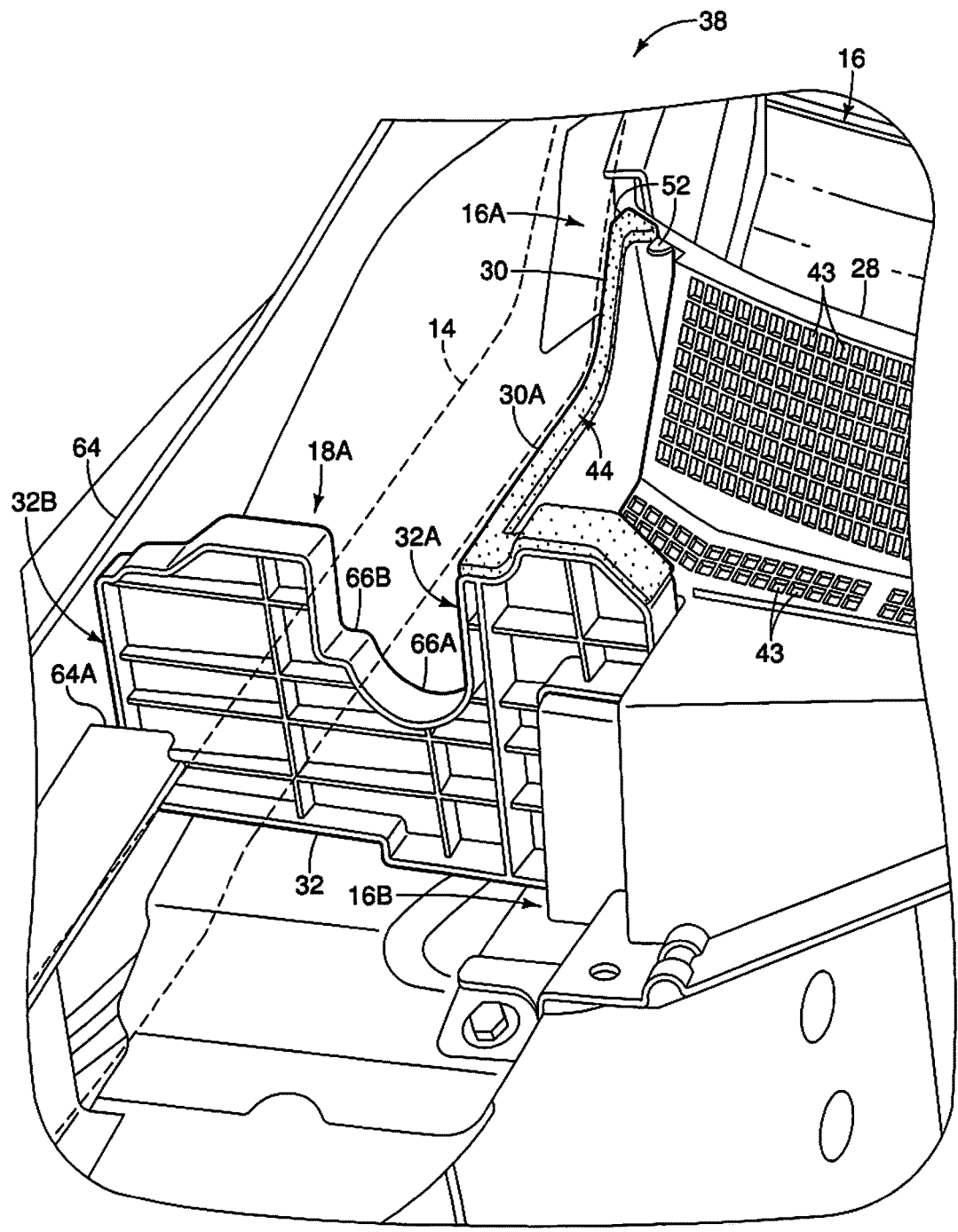
FIG. 8 is a front perspective view of the first hinge support area of FIGS. 3, 4 to 7 with the first cowl attachment area attached at the first end wall of the cowl.
Figure 9:
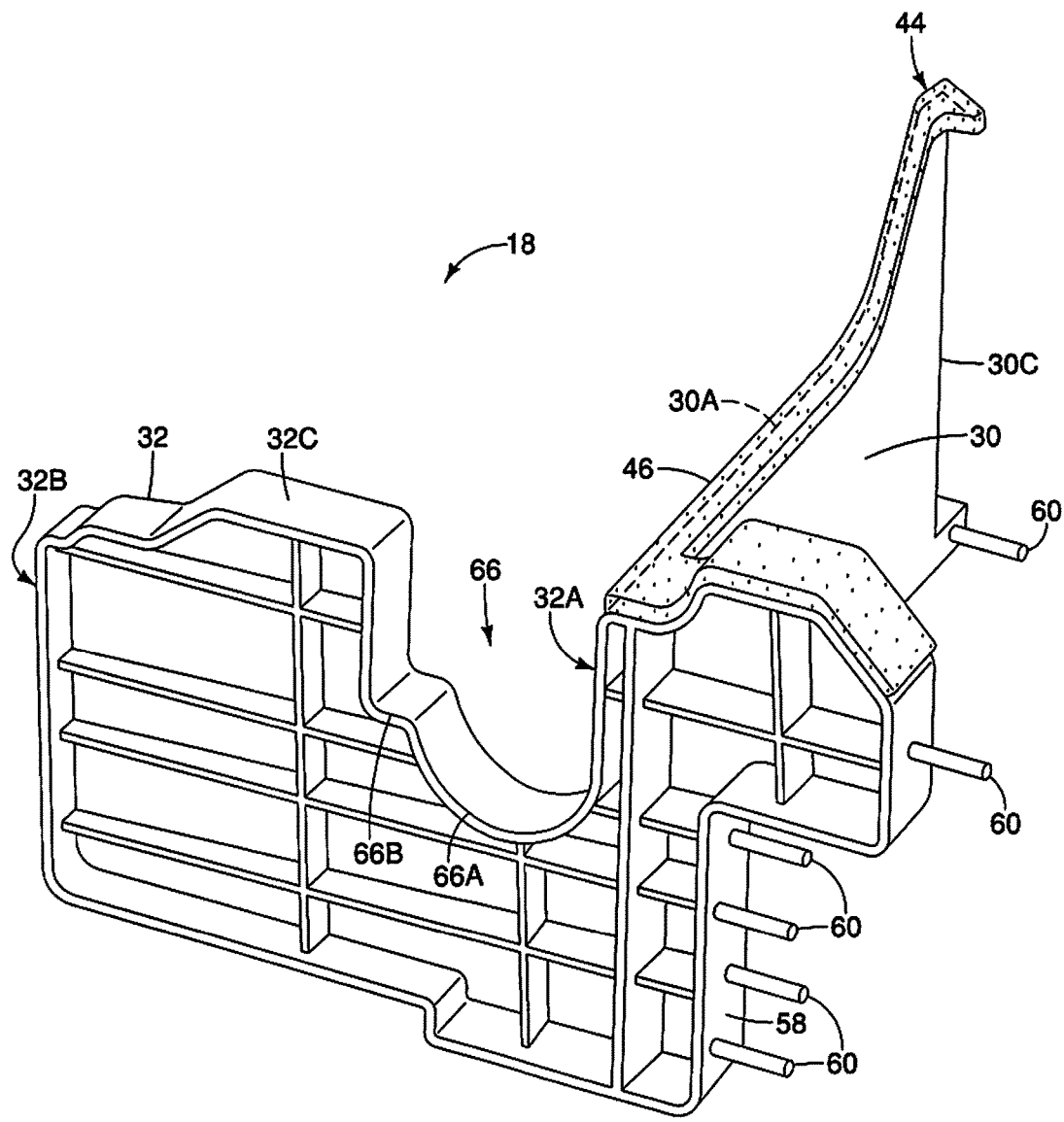
FIG. 9 is a front perspective view of the first cowl attachment part of FIGS. 4, 7 and 8 having a seal disposed on the baffle wall part.

As shown in FIG. 7, the first cowl attachment 18A further includes a seal 44 disposed on the upper surface 30A of the baffle wall part 30 of the first cowl attachment 18A. The hood 14 contacts the seal 44 in a closed state. Similarly, the second cowl attachment 18B further includes another seal 46 that is identical to the seal 44. The seal 46 of the second cowl attachment 18B part is disposed on an upper surface of the baffle wall part of the second cowl attachment 18B. The hood 14 also contacts the seal 46 of the second cowl attachment 18B part in a closed state. As the seals 44 and 46 of the first and second cowl attachments 18A and 18B are identical except for location and orientation, only the seal 44 of the first cowl attachment 18A part will be discussed further herein.

The seal 44 is configured to close a vertical gap between the first cowl attachment 18A and the hood 14. Thus, the seal 44 helps prevent air in the engine compartment 20 from entering the cowl 16. In the illustrated embodiment, the seal 44 is preferably made of foam or other type of elastic material, such as rubber and the like. In particular, the seal is a resilient and compressible member that deforms when the hood 14 is closed but substantially returns to its original shape when the hood 14 is opened. The seal 44 is fixedly disposed on the upper surface 30A. The seal 44 is preferably also fixedly disposed on the side surface 30C and the bottom surface 30B of the baffle wall part 30. Preferably, the seal 44 has a width that is at least the width of the upper surface 30A, the side surface 30C and the bottom surface 30B. In the illustrated embodiment, the upper surface 30A of the baffle wall part 30 has a shape corresponding to the shape of the hood interior. Preferably, the hood 14 lines up with the seal 44 and depresses the seal 44 when closed. Referring to FIG. 6, an outline of the hood 14 is illustrated in dotted lines.

The first cowl attachment 18A further includes a first attachment part 48 and a second attachment part 50 that are disposed on the baffle wall part 30. The first and second attachment parts 48 and 50 attach the first cowl attachment 18A to the cowl 16. The first attachment part 48 attaches the baffle wall part 30 of the first cowl attachment 18A to a rearward area 16A of the cowl 16. Specifically, the first attachment part 48 attaches the baffle wall part 30 to an area rearward of the first end wall 28A.

The first attachment part 48 includes the side surface 30C of the baffle wall part 30 that lines up against the rearward area 16A of the cowl 16. Thus, the rearward area 16A is an attachment area of the cowl 16. The side surface 30C can include a plurality of protrusions and a plurality of indents that are sized and shaped to correspond to the grooves and indents of the first attachment area where the side surface 30C is to be attached. Preferably, the rearward area 16A includes a pair of protrusions 52 that are guide members that receive the side surface 30C of the baffle wall part 30 therebetween.

The first cowl attachment 18A further includes a flange 54 extending from the baffle wall part 30. In the illustrated embodiment, the first attachment part 48 includes the flange 54. That is, the flange 54 extends from the side surface 30C of the baffle wall part 30. The flange 54 has an opening 56 configured to receive a fastener F. Thus, the flange 54 receives the fastener F to attach the cowl attachment to the rearward area 16A of the cowl 16. The fastener F can be a bolt or a screw or any other type of suitable attachment member as needed and/or desired.

The second attachment part 50 attaches a front end section 58 of the baffle wall part 30 to a forward area 16B of the cowl 16, which is forward of the vehicle 10 with respect to the rearward area 16A when the first cowl attachment 18A is attached to the cowl 16. Thus, the forward area 16B of the cowl 16 is also an attachment area of the cowl 16. The front end section 58 includes a plurality of extensions 60 that attach the first cowl attachment 18A to the forward area 16B of the cowl 16. Thus, the first cowl attachment 18A further includes at least one extension that is received by a recess 62 disposed in the forward area 16B of the cowl 16, as best seen in FIG. 5. In the illustrated embodiment, the extensions 60 are attachment fingers that are received by corresponding recesses 62 on the forward area 16B of the cowl 16. Also, in the illustrated embodiment, the extensions 60 are configured to be clipped to the corresponding recesses 62. However, it will be apparent to those skilled in the art from this disclosure that the second attachment part 50 and the forward area 16B can include various types of attachment structures and attachment mechanisms as needed and/or desired. Also, while the first cowl attachment 18A is illustrated as having five extensions, it will be apparent to those skilled in the art from this disclosure that the second attachment part 50 can include a various number of extensions as needed and/or desired. Preferably, the first cowl attachment 18A is attached to the cowl 16 at the forward area 16B and then the rearward area 16A. A similar process can take place with respect to the second cowl attachment 18B to the cowl 16. The cowl 16 having the first and second attachments 18A can then be assembled into the cowl area 24 of the vehicle 10.

The cowl extension part 32 will now be discussed. The cowl extension part 32 is a rigid portion that is sized and dimensioned to anchor the cowl in the cowl area 24. The cowl extension part 32 extends in the vehicle lateral direction L from the baffle wall part 30. In the illustrated embodiment, the cowl extension part 32 extends to a hood ledge 64 of the vehicle 10 to anchor the cowl 16 to the vehicle body 12. As best seen in FIG. 6, the second end section 32B of the cowl extension part 32 fits into a cutout 64A of the hood ledge 64. The cowl extension part 32 is sized and dimensioned to fit into the cowl area 24 and the engine compartment 20. It will be apparent to those skilled in the art that the first cowl attachment 18A can include a cowl extension part 32 having varying sizes and dimensions to fit into various types of vehicle spaces as needed and/or desired.

The cowl extension part 32 includes a cutout 66 that receives a portion of the hood 14 support structure. The cutout 66 is located on an upper surface 32C of the cowl extension part 32. The cutout 66 includes a hood strut receiving area 66A and a hood hinge receiving area 66B. Thus, the hood strut 34 and the hood hinge 36 can be received into the cowl extension part 32 when the hood 14 is closed. It will be apparent to those skilled in the art from this disclosure that the cowl extension part 32 can include additional attachment areas that fixedly attach the cowl extension part 32 to vehicle body 12 as needed and/or desired.

GENERAL INTERPRETATION OF TERMS

In understanding the scope of the present invention, the terms "part," "section," "portion," "member" or "element" when used in the singular can have the dual meaning of a single part or a plurality of parts. Also as used herein to describe the above embodiment(s), the following directional terms "forward", "rearward", "upper", "bottom", "downward", "vertical", "horizontal", "below" and "transverse" as well as any other similar directional terms refer to those directions of a vehicle equipped with the cowl attachment. Accordingly, these terms, as utilized to describe the present invention should be interpreted relative to a vehicle equipped with the cowl attachment.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
   a vehicle body defining an engine compartment and a passenger compartment that is located rearward of the engine compartment;
   a cowl including a top wall extending in a vehicle lateral direction between the engine and passenger compartments, the top wall having a first end wall at a first end and a second end wall at a second end, the first end wall having a plurality of first air receiving apertures; and
   a first cowl attachment having a baffle wall part and a cowl extension part, the first cowl attachment being fixedly attached to the first end wall such that the baffle wall part is adjacent to the air receiving apertures, the cowl extension part extending in a vehicle lateral direction from the baffle wall part.

2. The vehicle according to claim 1, wherein the baffle wall part and the cowl extension part are a one-piece structure.

3. The vehicle according to claim 1, wherein the cowl extension part has a first end that is integral with the baffle wall part and a second end that is cantilevered with respect to the baffle wall part.

4. The vehicle according to claim 1, further comprising a hood movably attached to the vehicle body by a first hood support structure and a second hood support structure, the hood, the first end wall and the cowl extension part defining a first hood hinge receiving space.

5. The vehicle according to claim 4, further comprising a second cowl attachment having a baffle wall part and a cowl extension part, the second cowl attachment being attached to the second end wall such that the baffle wall part of the second cowl attachment is adjacent to a plurality of second air receiving apertures on the second end wall.

6. The vehicle according to claim 5, wherein the hood, the second end wall and the cowl extension part of the second cowl attachment defines a second hood hinge receiving space.

7. The vehicle according to claim 4, wherein the cowl attachment further includes a seal disposed on an upper surface of the baffle wall part, the hood contacting the seal in a closed state.

8. The vehicle according to claim 6, wherein the second cowl attachment further includes a seal disposed on an upper surface of the baffle wall part of the second cowl attachment, the hood contacting the seal in a closed state.

9. The vehicle according to claim 1, wherein the cowl extension part includes a cutout that receives a portion of a hood support structure.

10. The vehicle according to claim 1, wherein the cowl attachment further includes a first attachment part and a second attachment area that are disposed on the baffle wall part, the first and second attachment parts attaching the cowl attachment to the cowl.

11. The vehicle according to claim 10, wherein the first attachment part attaches the baffle wall part to a rearward area of the cowl, and the second attachment part attaches a front end section of the baffle wall part to a forward area of the cowl.

12. The vehicle according to claim 1, wherein the cowl attachment further includes a flange extending from the baffle wall part includes, the flange receiving a fastener F to attach the cowl attachment to a rearward area of the cowl.

13. The vehicle according to claim 12, wherein the cowl attachment further includes at least one extension that are received by a recess disposed in a forward area of the cowl.

* * * * *